(12) United States Patent
Iwasaki et al.

(10) Patent No.: US 9,983,369 B2
(45) Date of Patent: May 29, 2018

(54) ARTICULATE JOINT MECHANISM HAVING CABLE

(71) Applicant: HONDA MOTOR CO., LTD., Tokyo (JP)

(72) Inventors: Shingo Iwasaki, Wako (JP); Ryusuke Ishizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/493,575

(22) Filed: Apr. 21, 2017

(65) Prior Publication Data

US 2017/0307836 A1 Oct. 26, 2017

(30) Foreign Application Priority Data

Apr. 25, 2016 (JP) ................................. 2016-087478

(51) Int. Cl.
*G02B 6/42* (2006.01)
*B25J 17/00* (2006.01)
*G02B 6/38* (2006.01)
*G02B 6/44* (2006.01)

(52) U.S. Cl.
CPC ............ *G02B 6/4256* (2013.01); *B25J 17/00* (2013.01); *G02B 6/3887* (2013.01); *G02B 6/443* (2013.01); *Y10S 901/28* (2013.01)

(58) Field of Classification Search
CPC ..... B25J 19/0025; B25J 19/0029; B25J 17/00
See application file for complete search history.

(56) References Cited

U.S. PATENT DOCUMENTS

2004/0170363 A1* 9/2004 Angela ................ B25J 19/0029
385/100
2014/0358161 A1* 12/2014 Hourtash ............... A61B 34/37
606/130

FOREIGN PATENT DOCUMENTS

JP 2015174208 A 10/2015

* cited by examiner

*Primary Examiner* — Omar R Rojas
(74) *Attorney, Agent, or Firm* — Armstrong Teasdale LLP

(57) ABSTRACT

An articulate joint mechanism includes a first link (L1, A1, M1, U1), a second link (L2, A2, M2, U2), a coupling (KR, KR1, ER, ER1, ER2, MR, UR) mechanically connecting the first link with the second link in a mutually moveable manner at least with one degree of freedom, and an optical fiber cable (11, 21, 31, 41) extending from the first link to the second link via the coupling, the optical fiber cable including a fiber cable core (F1, F2, F3, F4) and a sheath (C1, C2, C3, C4) surrounding the fiber cable core. The joint mechanism comprises a first cable retaining part (P1) provided in a part of the first link and including a sheath fixing part (P1-2) for fixedly securing the sheath to the first link and a core fixing part (P1-1) for fixedly securing the fiber cable core to the first link, and a first cable engaging part (Q1) provided in a part of the first link located between the first cable retaining part and the coupling and including a sheath fixing part (Q1-2) for fixedly securing the sheath to the first link while allowing the optical fiber core to deflect freely.

16 Claims, 7 Drawing Sheets

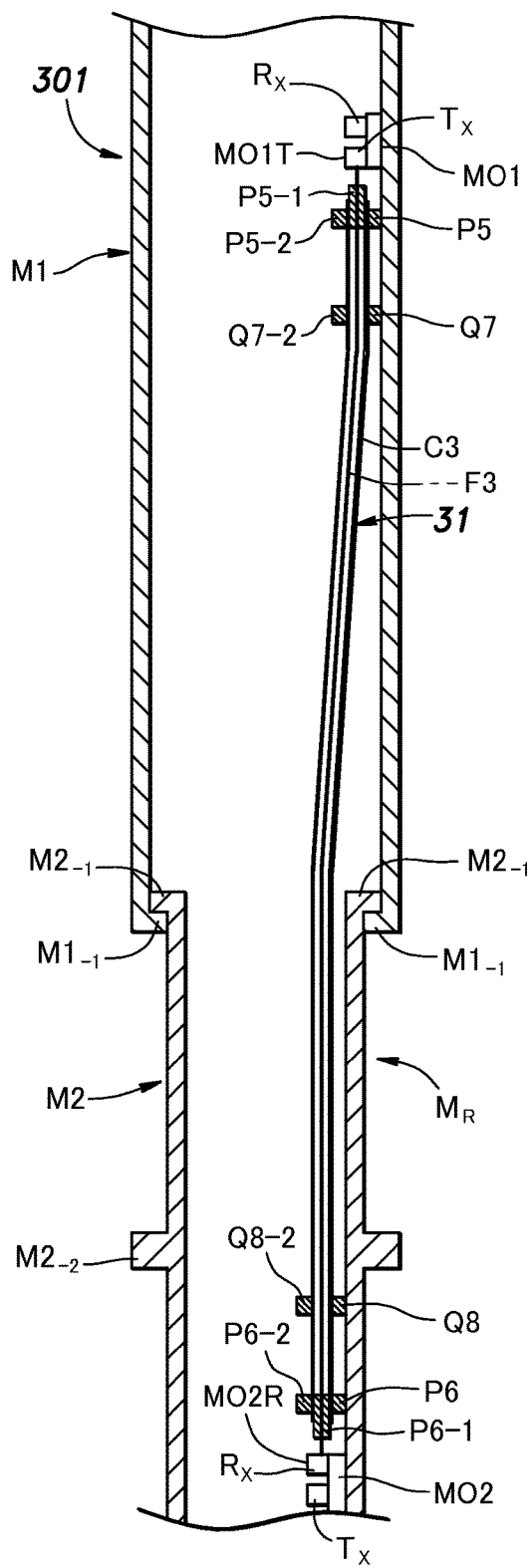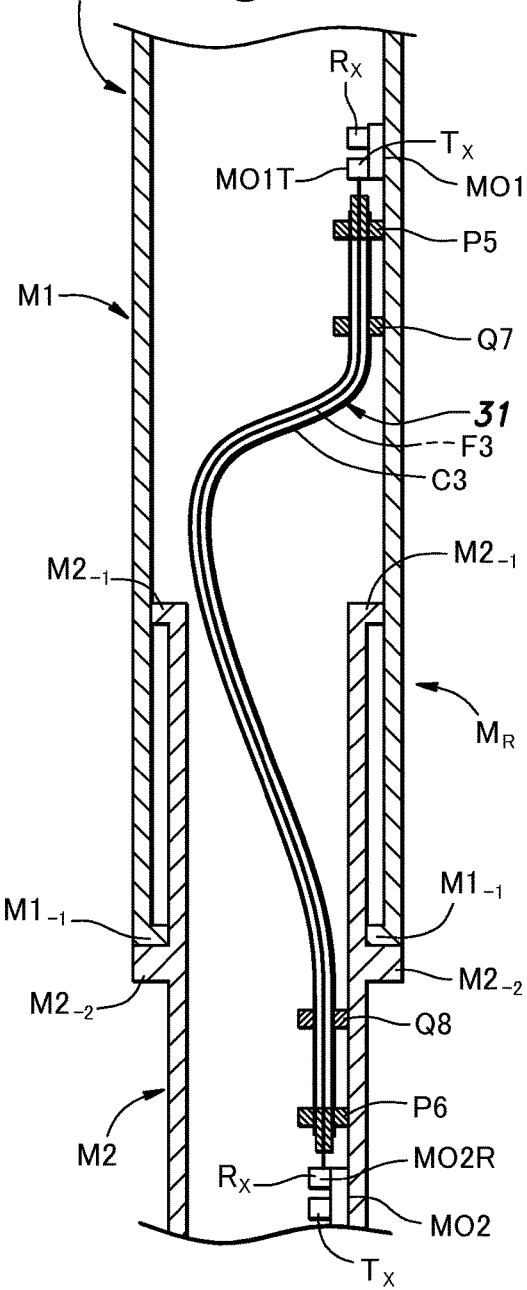

ARTICULATE JOINT MECHANISM HAVING CABLE

TECHNICAL FIELD

The present invention relates to an articulate joint mechanism having an optical fiber cable extending through the joint mechanism.

BACKGROUND ART

Various machines such as robots use articulate joints for achieving a desired movement of a working end of the machine. JP2015-174208A discloses a robot including links provided with transceivers and articulate joints mechanically connecting adjoining links. In such applications, a cable such as an optical fiber cable is required to be passed through such articulate joints. However, the cable is often unable to withstand excessive bending so that a certain amount of slack is given to each cable.

This problem is particularly acute in the field of robots which are often provided with a large number of links and articulate joints. Each link is provided with one or more transceivers, and signals are required to be exchanged between these transceivers across the articulate joints mechanically connecting the adjoining links to each other. Therefore, it is important to ensure the integrity of the optical fiber cable at each articulate joint.

SUMMARY OF THE INVENTION

In view of such problems of the prior art, a primary object of the present invention is to provide an articulate joint mechanism mechanically connecting adjoining links to each other and having an optical fiber cable extending through the articulate joint that can prevent any damage to the optical fiber cable even when the adjoining links are moved relative to each other via the articulate joint.

To achieve such an object, the present invention provides an articulate joint mechanism including a first link (L1, A1, M1, U1), a second link (L2, A2, M2, U2), a coupling (KR, KR1, ER, ER1, ER2, MR, UR) mechanically connecting the first link with the second link in a mutually moveable manner at least with one degree of freedom, and an optical fiber cable (11, 21, 31, 41) extending from the first link to the second link via the coupling, the optical fiber cable including a fiber cable core (F1, F2, F3, F4) and a sheath (C1, C2, C3, C4) surrounding the fiber cable core, the mechanism comprising: a first cable retaining part (P1) provided in a part of the first link and including a sheath fixing part (P1-2) for fixedly securing the sheath to the first link and a core fixing part (P1-1) for fixedly securing the fiber cable core to the first link; and a first cable engaging part (Q1) provided in a part of the first link located between the first cable retaining part and the coupling and including a sheath fixing part (Q1-2) for fixedly securing the sheath to the first link while allowing the optical fiber core to deflect freely.

The optical fiber core is fixedly secured at the cable retaining part, but is allowed to deflect freely at the cable engaging part. Therefore, when the optical fiber cable is bent, twisted or otherwise deformed in a part adjacent to the coupling, the fiber cable core is allowed to move within the sheath, and bend less sharply than the sheath so that the stress that may be produced in the fiber cable core can be minimized.

In a preferred embodiment of the present invention, the articulate joint mechanism further comprises a second cable retaining part (P2) provided in a part of the second link and including a sheath fixing part (P2-2) for fixedly securing the sheath to the second link and a core fixing part (P2-1) for fixedly securing the fiber cable core to the second link; and a second cable engaging part (Q2) provided in a part of the second link located between the second cable retaining part and the coupling and including a sheath fixing part (Q2-2) for fixedly securing the sheath to the second link while allowing the optical fiber core to deflect freely.

Thereby, the fiber cable core can deflect freely within the sheath both in the first link and the second link so that the stress of the fiber cable core can be minimized when the first link and the second link move relative to each other about the coupling.

In another preferred embodiment of the present invention, the first link and the second link are mechanically connected to each other via a first coupling, an intermediate link and a second coupling which are connected in series in that order, each coupling connecting the associated links in a mutually moveable manner with at least one degree of freedom, and the intermediate link is provided with a pair of intermediate cable engaging parts positioned in an axially spaced apart relationship and each including a sheath fixing part for fixedly securing the sheath to the intermediate link while allowing the optical fiber core to deflect freely.

In this embodiment, the first link and the second link can move relative to each other with at least two degrees of freedom, but the optical fiber cable can be extending between the first link and the second link via the intermediate link without suffering from any under stress.

In yet another embodiment of the present invention, the first link further comprises an auxiliary cable engaging part provided between the first cable retaining part and the first cable engaging part and including a sheath fixing part for fixedly securing the sheath to the first link while allowing the optical fiber core to deflect freely.

Thereby, the optical fiber cable may extend along the first link without causing any undue stress to the part of the fiber cable core extending along the intermediate link.

In yet another embodiment of the present invention, the first link further comprises a first auxiliary cable engaging part provided between the first cable retaining part and the first cable engaging part and including a sheath fixing part for fixedly securing the sheath to the first link while allowing the optical fiber core to deflect freely, and the second link further comprises a second auxiliary cable engaging part provided between the second cable retaining part and the second cable engaging part and including a sheath fixing part for fixedly securing the sheath to the second link while allowing the optical fiber core to deflect freely.

The auxiliary cable engaging parts allow the optical fiber cable to be neatly arranged without causing any excessive bend in the fiber cable core.

The coupling typically comprises a pivot coupling. In this case, the coupling may include a pivot pipe pivotally connecting opposing ends of the first link and the second link, and the optical fiber cable is passed through an inner bore of the pivot pipe.

Thereby, the optical fiber cable can be arranged in a highly compact manner without causing any excessive stress in the fiber cable core.

The first coupling and the second coupling may comprise pivot couplings, respectively, having mutually orthogonal rotational center lines. Thereby, the joint mechanism may allow a movement with two degrees of freedom between the first link and the second link in a simple manner.

In yet another embodiment of the present invention, the coupling comprises a linear coupling configured to allow the first link and the second link to move axially relative to each other. In this case, the first link and the second link may comprise tubular members that are telescopically combined with each other, and the first cable retaining part and the first cable engaging part are provided on an inner wall surface of the first link.

In this case also, even when the first link and the second link are retraced and extended relative to each other, the sheath of the optical fiber cable may be bent as a result, but the fiber cable core is prevented from being excessively bent or otherwise subjected to excessive stress.

In yet another embodiment of the present invention, the coupling comprises a twist coupling configured to allow the first link and the second link to turn around an axial line relative to each other. In this case, the first link and the second link may comprise tubular members that are coaxially combined with each other, and the first cable engaging part is positioned on an axial center line of the two links.

In this case also, even when the first link and the second link are twisted relative to each other, the sheath of the optical fiber cable may be bent or twisted as a result, but the fiber cable core is prevented from being excessively bent or otherwise subjected to excessive stress. When a large part of the optical fiber cable is retained along the central axial line of the first link and/or the second link, the bending of the optical fiber cable can be minimized, and the stress on the optical fiber core can be minimized.

The optical fiber cable typically includes a single fiber cable core received in the sheath, but may also include two or more optical fiber cores received in the same sheath.

A tolerable minimum radius of curvature of the fiber cable core may be smaller than that of the sheath.

Thereby, any damage to the optical fiber cable can be easily detected from outside because as long as the sheath is in good order, it can be surmised that the optical fiber core is sound. If any damage in the sheath is detected, it is then possible that the optical fiber core may also be damaged.

The core fixing part may include an annular member coaxially interposed between the fiber cable core and the sheath.

Thereby, the core fixing part can fixedly secure the optical fiber core to the associated link via the sheath fixing part so that the material cost can be saved, and the overall structure of the cable retaining part can be simplified.

In yet another embodiment of the present invention, the sheath has a terminal end at a part displaced from the cable retaining part away from the cable engaging part, and the core fixing part extends further away from the first cable engaging part than the terminal end of the sheath.

Thereby, the part of the fiber cable emerging from the sheath is favorably supported by the core fixing part so that the part of the optical fiber core extending out of the sheath can be protected from stress or damages.

BRIEF DESCRIPTION OF THE DRAWING(S)

FIG. 6A is a sectional view of a linear joint mechanism including an optical fiber cable extending through the linear joint mechanism;

FIG. 6B is a view similar to FIG. 6A showing the linear joint in a retracted state;

DESCRIPTION OF THE PREFERRED EMBODIMENT(S)

Preferred embodiments of the present invention are described in the following with reference to the appended drawings.

Figure 1:
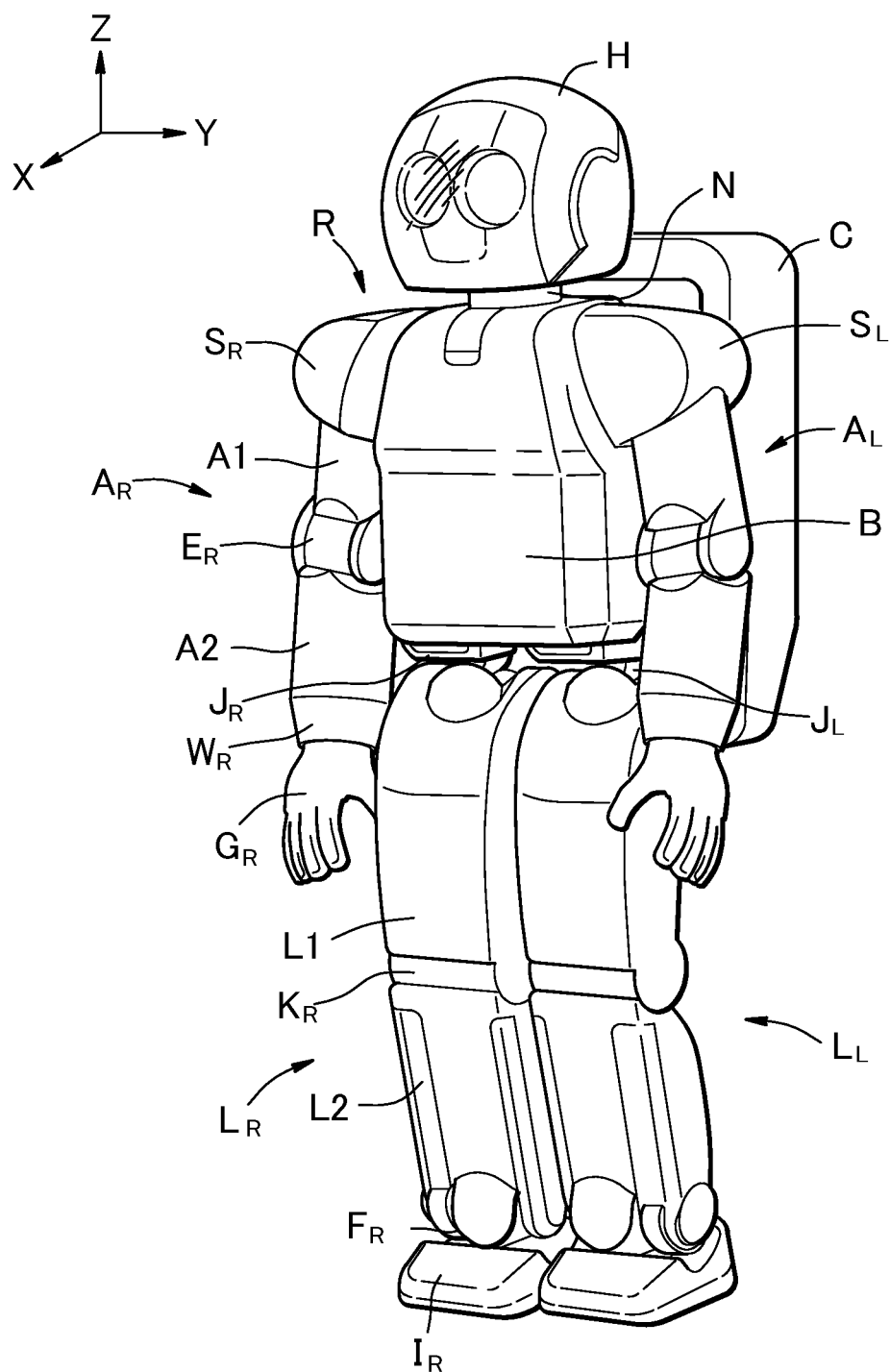
FIG. 1 is a perspective view of a robot fitted with articulate joint mechanisms of the present invention.

As shown in FIG. 1, the robot R of the illustrated embodiment consists of a bipedal robot that can walk and run autonomously. In the following description, from the view point of the robot R, the fore and aft direction is defined as X-axis, the lateral direction as Y-axis, and the vertical direction as Z-axis. The robot R is provided with a head H, a pair of arms AL and AR, a torso B, and a pair of legs LL and LR. The head H is connected to the torso B which is the main part of the robot R via a neck joint N. One of the arms AL is connected to a left side of the torso B via a shoulder joint SL, and the other arm AR is connected to a right side of the torso B via a shoulder joint SR. One of the legs LL is connected to a lower left side of the torso B via a hip joint JL, and the other leg LR is connected to a lower right side of the torso B via a hip joint JR. A back pack carried on the back of the torso B consists of a control unit housing C containing a control unit for controlling the head H, the torso B, the arms AL and AR, and the legs LL and LR. As the robot R is symmetric with respect to a sagittal plane, only one of a pair of body parts may be described in the following description as the two body parts are mirror images of one another.

The leg LR includes an upper link L1 having an upper end connected to a lower right part of the torso B via the hip joint JR, and a lower link L2 having an upper end connected to the lower end of the upper link L1 via a knee joint KR. The lower end of the lower link L2 is connected via an ankle joint FR to a foot IR that contacts the ground surface.

The arm AR includes an upper link A1 having an upper end connected to an upper right part of the torso B via the shoulder joint SR, and a lower link A2 connected to the lower end of the upper link A1 via an elbow joint ER. The lower end of the lower link A2 is connected via a wrist joint WR to a gripper GR emulating a human hand for gripping things.

Figure 2:
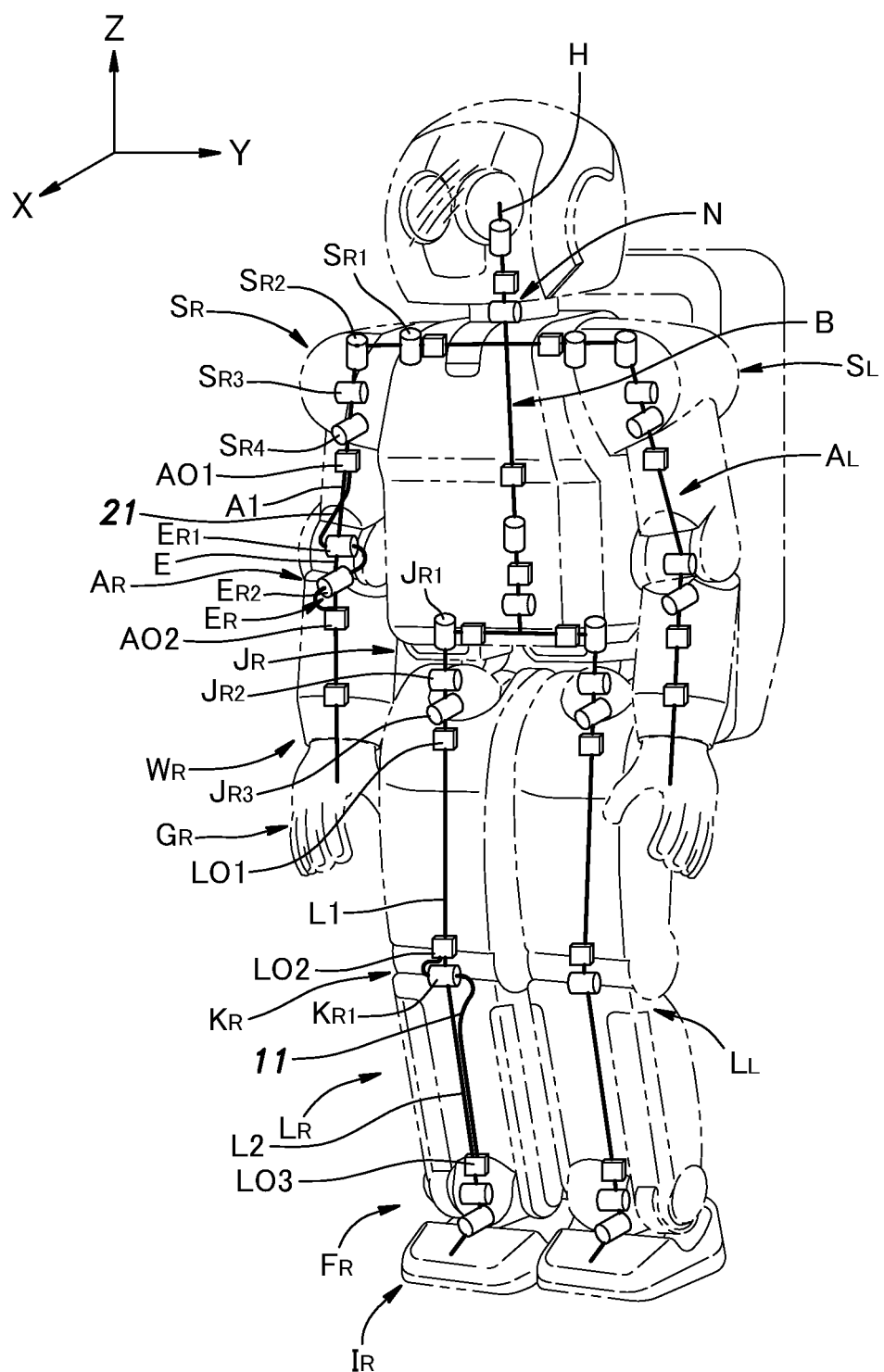
FIG. 2 is a diagram illustrating the positioning of the articulate joint mechanisms and optical transceiver modules.

As shown in FIG. 2, each joint of the robot R includes one or more couplings movably connecting the adjoining links with at least one degree of freedom. The movement permitted by each coupling between the adjoining links may include a roll movement around the X-axis, a pitch movement around the Y-axis, and a yaw movement around the Z-axis. As a special case, a coupling may permit a relative linear (telescopic) movement along an axial line between the adjoining links, or a twist movement around an axial line between the adjoining links. By combining such couplings, each joint may permit a relative movement of one or more degrees of freedom between the associated links. Each of the links that form the moveable parts of the robot R is provided with one or more optical transceiver modules LO1, LO2, LO3, AO1, AO2, AO3 for transmitting and receiving optical signals for the attitude control of the corresponding link. These optical transceiver modules LO1, LO2, LO3, AO1, AO2, AO3 are connected to each other via optical fiber cables 11, 21, 31 and 41 that pass through the corresponding joints.

In the illustrated embodiment, the optical transceiver modules LO1, LO2, LO3, AO1, AO2, AO3 are connected to each other via the optical fiber cables 11, 21, 31 and 41 forming an optical fiber cable network having a ring network topology. As shown in FIG. 2, each arm or leg is formed by a plurality of links that are connected in series. Therefore, a pair of optical fiber cables are passed thorough each joint to transmit signals in mutually opposite directions. On the other hand, in a fully connected network topology, when there are three or more links, three or more optical fiber cables are required to be passed through each joint. For this reason, the ring network topology is advantageous in robots where signals are required to be passed through various joints.

The leg LR is connected to a lower end of the torso B via the hip joint JR which is provided with three couplings JR1, JR2 and JR3 that can pivot around the X-axis, Y-axis and Z-axis (three axes), respectively. The upper link L1 is connected to the coupling JR3 which is provided in the lowermost part of the hip joint JR. The lower link L2 is connected to the lower end of the upper link L1 via the knee joint KR which includes a coupling KR1 that is pivotable around the Y-axis. The optical transceiver module LO1 is provided in an upper part of the upper link L1, and the optical transceiver module LO2 is provided in a lower part of the upper link L1. The optical transceiver module LO3 is provided in a lower part of the lower link L2.

The upper link A1 of the arm AR has an upper end connected to the upper right end of the torso B via the shoulder joint SR. The lower end of the upper link A1 is connected to the upper end of the lower link A2 via the elbow joint ER. The elbow joint ER includes a coupling ER1 for a pivotal motion around the X-axis and a coupling ER2 for a pivotal motion around the Y-axis. An intermediate link E is connected between the two couplings ER1 and ER2. The upper link A1 is provided with the optical transceiver module AO1, and the lower link A2 is provided with the optical transceiver module AO2.

(First Embodiment)

Figure 3:
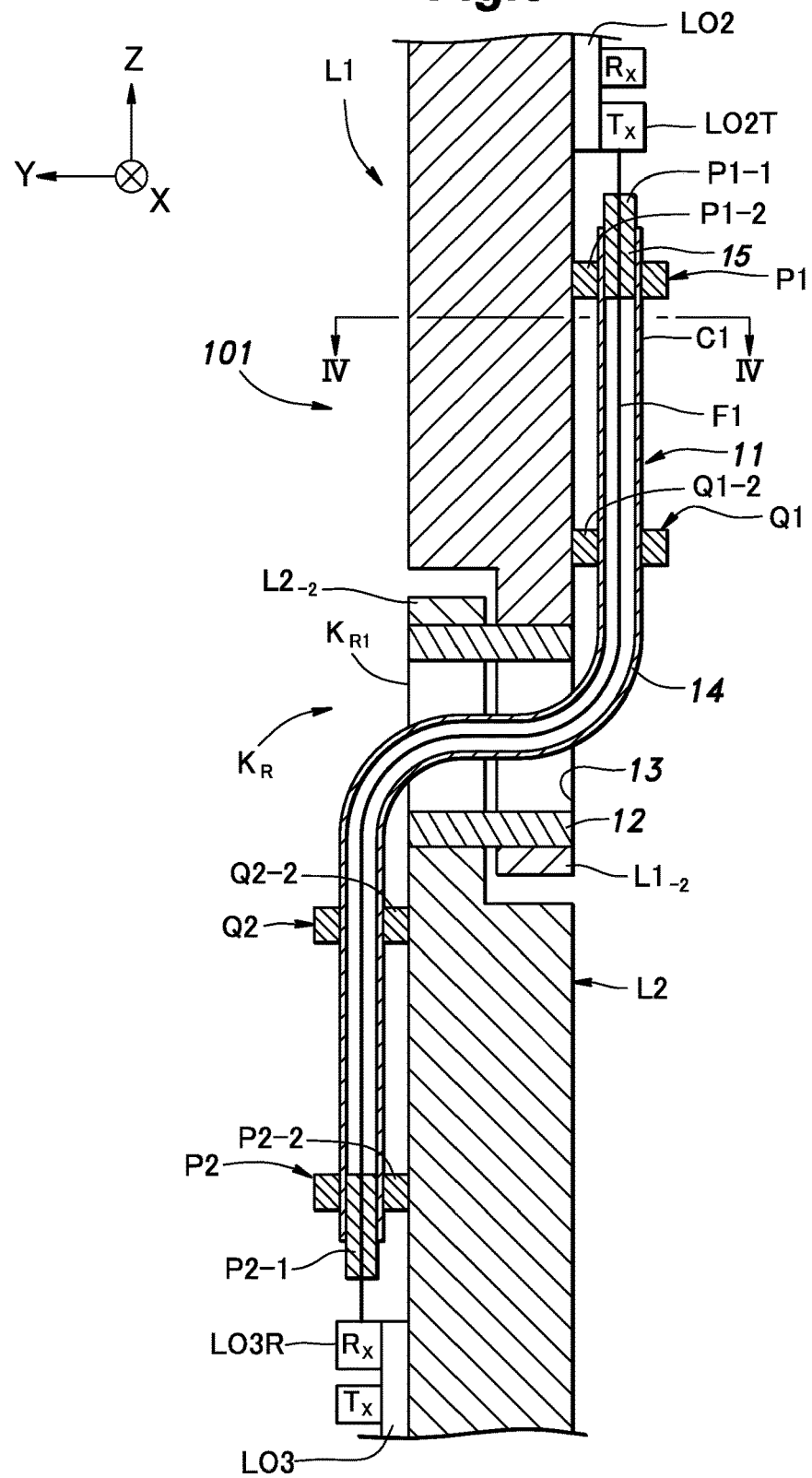
FIG. 3 is a diagram illustrating a knee joint of the robot including an optical fiber cable extending through the knee joint.

A joint mechanism 101 that can be used in any of the joints mentioned above is now described in the following with respect to the joint mechanism 101 used for the right leg LR of the robot R. Referring to FIG. 3, the optical transceiver module LO2 is attached to the right side (negative side on the Y-axis) of the upper link L1, and the optical transceiver module LO3 is attached to the left side (positive side on the Y-axis) of the lower link L2. The optical fiber cable 11 connected between the optical transceiver module LO2 and the optical transceiver module LO3 includes a single optical fiber core F1 and a tubular sheath C1 surrounding the optical fiber core F1 in a substantially coaxial and spaced apart relationship.

The optical fiber core F1 preferably but not exclusively consists of a core for transmitting optical signals, and a clad coated on the outer circumferential surface of the core, and may also include a cover layer made of plastic material or fibers covering the outer surface of the clad. In the illustrated embodiment, the sheath C1 consists of a solid but flexible tube, but may also be formed with slits, corrugation and other features for increasing the flexibility of the sheath C1. The material for the sheath C1 preferably but not exclusively consists of flexible plastic material such as low density polyethylene.

Figure 4A:
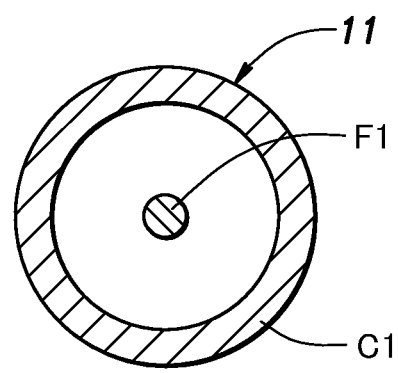
FIG. 4A is a sectional view taken along line IV-IV of FIG. 3 showing a cross section of the optical fiber cable.
Figure 4B:
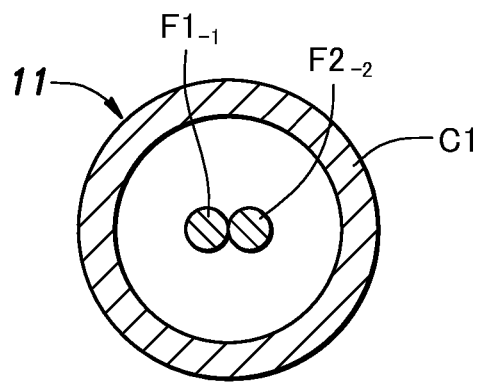
FIG. 4B is a view similar to FIG. 4A showing an optical fiber cable including two fiber cable cores.

As shown in FIG. 4A, the optical fiber core F1 is centrally received in the sheath C1 in a substantially coaxial manner. As there is an annular space defined between the outer periphery of the optical fiber core F1 and the inner periphery of the sheath C1, the optical fiber core F1 may deflect or otherwise move within the sheath C1. Owing to the presence of the sheath C1, any side pressure that may be applied to the optical fiber cable 11 is prevented from being applied to the optical fiber core F1 so that any loss in the transmission property of the optical fiber cable 11 can be avoided. The sheath C1 receives only one optical fiber core F1 in the illustrated embodiment shown in FIG. 4A, but two or more optical fiber cores F1-1 and F1-2 may be received in a single sheath C1 as shown in FIG. 4B.

Referring to FIG. 3 again, one end of the optical fiber core F1 is connected to an optical transmitter LO2T of the optical transceiver module LO2 for transmitting the optical signal from the optical transceiver module LO2. The optical fiber core F1 then extends downward, and is passed into the sheath C1 at a cable retaining part P1. At the cable retaining part P1, an end of the sheath C1 is fixedly attached to the upper link L1 via a sheath fixing part P1-2, and the optical fiber core F1 is fixedly attached to the sheath C1 via a core fixing part P1-1. The sheath C1 is firmly interposed between the core fixing part P1-1 and the sheath fixing part P1-2. Therefore, the optical fiber core F1 is fixedly attached to the upper link L1 via the core fixing part P1-1 and the sheath fixing part P1-2. In the illustrated embodiment, the core fixing part P1-1 includes an annular member 15 coaxially interposed between the optical fiber core F1 and the sheath C1. The annular member 15 is coaxially disposed in the sheath C1 and has the optical fiber core C1 passing therethrough. Alternatively, the optical fiber core F1 may be fixedly attached to the upper link L1 solely via the core fixing part P1-1 by directly securing the core fixing part P1-1 to the upper link L1.

In the illustrated embodiment, the core fixing part P1-1 retains the optical fiber core F1 centrally in the sheath C1, and extends further upward than the upper open end of the sheath C1. Because the core fixing part P1-1 extends further upward than the upper open end of the sheath C1, the optical fiber core F1 is prevented from being sharply bent (or being subjected to a stress concentration) at the open end of the sheath C1.

After passing downwardly through the cable retaining part P1, the optical fiber cable 11 passes through a cable engaging part Q1 at a point slightly short of the knee joint KR which in this case consists of a knee coupling KR1. The cable engaging part Q1 includes a sheath fixing part Q1-2 that fixedly secures the sheath C1 to the upper link L1. The cable engaging part Q1 is not provided with a part that retains the optical fiber core F1 either to the sheath C1 or to the upper link L1. Therefore the optical fiber core F1 can deflect or otherwise move within the sheath C1 at the cable engaging part Q1. After passing through the cable engaging part Q1, the optical fiber cable 11 extends further along the upper link L1 to the lower end thereof.

The core fixing part P1-1 may secure the optical fiber core F1 to the sheath C1 in a number of different ways. For instance, an elastic member made of elastomer or other elastic material and formed around the optical fiber core F1 may be forced into the sheath C1 so that the optical fiber core F1 may be frictionally engaged by the sheath C1.

Alternatively or additionally, a bonding agent may be applied to the inner circumferential surface of the sheath C1 to fixedly secure the optical fiber core F1 to the sheath C1 optionally via a relatively hard tubular member centrally receiving the optical fiber core F1.

The sheath C1 is fixedly secured to the upper link L1 via the sheath fixing part P1-2 and the sheath fixing part Q1-2. The sheath C1 may be fixedly secured to the upper link L1 preferably but not exclusively by using a bonding agent, or by tying the sheath C1 to the upper link L1 by using a string, a belt or any other binding material.

The lower end of the upper link L1 is provided with a link connecting portion L1-2 having a plate like configuration and having a hole passed orthogonally through the major plane thereof. A corresponding link connecting portion L2-2 of a complementary configuration is provided in the upper end of the lower link L2. A pivot pipe 12 is passed through the holes of the two link connecting portions L1-2 and L2-2 so as to jointly form the coupling KR1 by which the upper link L1 and the lower link L2 are connected to each other so as to be pivotable around the Y-axis.

The optical fiber cable 11 extending downward from the cable engaging part Q1 is bent (at a bend 14) leftward (positive direction along the Y-axis), and is passed through an inner bore 13 of the pivot pipe 12 at the coupling KR1. At the bend 14 of the optical fiber cable 11, the sheath C1 and the optical fiber core F1 may be spaced from each other in a substantially coaxial manner but, more accurately, the optical fiber core F1 may have a substantially greater radius of curvature than the sheath C1 at the bend 14. Therefore, the bending stress that is applied to the optical fiber core F1 at the bend 14 can be minimized. Also, the optical fiber cable 11 may be given with an adequate slack for the optical fiber cable 11 not to contact the open end of the pivot pipe 12. Even when the optical fiber cable 11 contacts the open end of the pivot pipe 12, only the sheath C1 comes into contact with the open end of the pivot pipe 12, and the optical fiber core F1 is prevented from contacting the sheath C1. For this reason also, the stress that may be applied to the optical fiber core F1 or the transmission loss of the optical fiber core F1 can be minimized.

The optical fiber core F1 is desired to be able to withstand bending stress that may be produced in operation. In particular, the radius of curvature that is tolerated for the optical fiber core F1 may be smaller than that for the sheath C1. Thereby, any damage to the optical fiber cable 11 can be easily detected from outside because as long as the sheath C1 is in good order, it can be surmised that the optical fiber core F1 is sound. If any damage in the sheath C1 is detected, it is then possible that the optical fiber core F1 may also be damaged.

The optical fiber cable 11 extends through the inner bore 13 of the pivot pipe 12, and the inner diameter of the inner bore 13 is significantly greater than the outer diameter of the optical fiber cable 11 so that the optical fiber cable 11 can freely deflect in any direction perpendicular to the Y-axis, and twist around the Y-axis without suffering from any undue stress in the inner bore 13.

After passing through the inner bore 13 of the pivot pipe 12, the optical fiber cable 11 is bent downward (negative direction along the Z-axis), and extends downward along the left side of the lower link L2. The optical fiber cable 11 passes through the cable engaging part Q2 that includes a sheath fixing part Q2-2 for fixedly securing the sheath C1 of the optical fiber cable 11 to the lower link L2. Thereby, the sheath C1 is fixedly secured to the lower link L2 by the sheath fixing part Q2-2. At the cable engaging part Q2, the optical fiber core F1 is not secured to the lower link L2 so as to be moveable in the sheath C1. In other words, the optical fiber core F1 is enabled to deflect and twist in the sheath C1 without touching the wall surface of the sheath C1 at the cable engaging part Q2.

The optical fiber cable 11 extends further downward from the cable engaging part Q2, and passes through a cable retaining part P2 which is located between the cable engaging part Q2 and the optical transceiver module LO3. At the cable retaining part P2, the sheath C1 is fixedly secured to the lower link L2 by a sheath fixing part P2-2, and the optical fiber core F1 is fixedly secured to the sheath C1 (and hence to the lower link L2 via the sheath fixing part P2-2) by a core fixing part P2-1.

The sheath C1 of the optical fiber cable 11 that has passed through the cable engaging part Q2 and the cable retaining part P2 terminates at a point intermediate between the cable retaining part P2 and the optical transceiver module LO3. In this part, the core fixing part P2-1 projects downward from the terminal end of the sheath C1 toward the optical transceiver module LO3, and the optical fiber core F1 extends centrally from the core fixing part P2-1 to be connected to an optical receiver LO3R of the optical transceiver module LO3.

(Second Embodiment)

A second embodiment of the present invention is described in the following taking an example in the right arm AR of the robot R with reference to FIG. 5. As can be appreciated by a person skilled in the art, a joint mechanism 201 used for the right arm AR as shown in FIG. 5 may also be applied to other body parts of the robot R including a joint.

Figure 5:
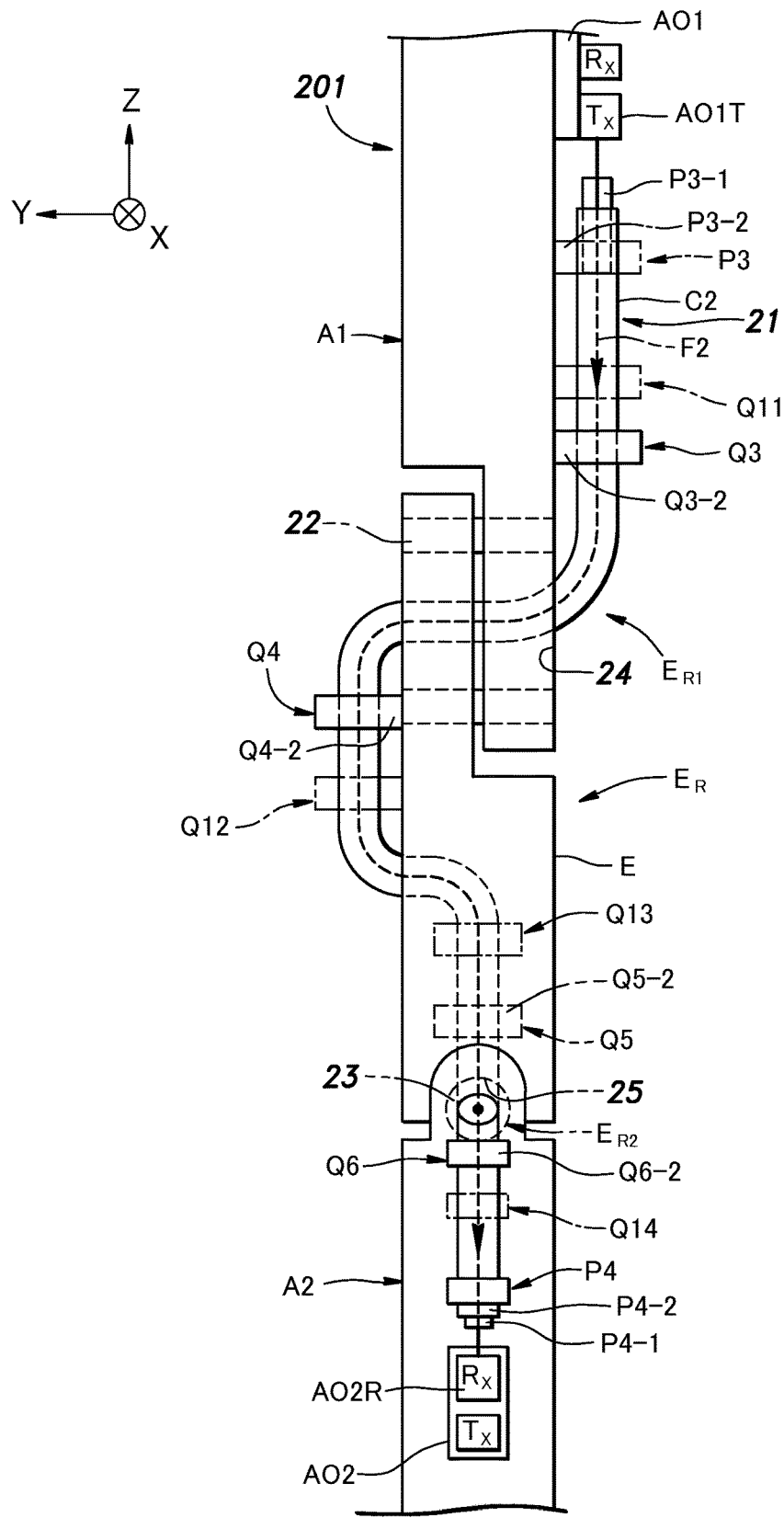
FIG. 5 is a diagram illustrating an elbow joint of the robot including an optical fiber cable extending through the elbow joint.

Referring to FIG. 5, the optical transceiver module AO1 is attached to the right side (negative side on the Y-axis) of the upper link A1, and the optical transceiver module AO2 is attached to the front side (positive side on the X-axis) of the lower link A2. The optical fiber cable 21 connected between the optical transceiver module AO1 and the optical transceiver module AO2 includes a single optical fiber core F2 and a tubular sheath C2 surrounding the optical fiber core F2 in a substantially coaxial and spaced apart relationship. The structure of the optical fiber cable 21 may be similar to that of the optical fiber cable 11 of the first embodiment.

One end of the optical fiber core F2 is connected to an optical transmitter AO1T of the optical transceiver module AO1 for transmitting the optical signal from the optical transceiver module AO1. The optical fiber core F2 then extends downward, and is passed into the sheath C2 at a cable retaining part P3. At the cable retaining part P3, an end of the sheath C2 is fixedly attached to the upper link A1 via a sheath fixing part P3-2, and the optical fiber core F2 is fixedly attached to the sheath C2 via a core fixing part P3-1. The sheath C2 is firmly interposed between the core fixing part P3-1 and the sheath fixing part P3-2. Therefore, the optical fiber core F2 is fixedly attached to the upper link A1 via the core fixing part P3-1 and the sheath fixing part P3-2. Alternatively, the optical fiber core F2 may be fixedly attached to the upper link A1 solely via the core fixing part P3-1 by directly securing the core fixing part P3-1 to the upper link A1.

In the illustrated embodiment, the core fixing part P3-1 retains the optical fiber core F2 centrally in the sheath C2, and extends further upward than the upper open end of the sheath C2. Because the core fixing part P3-1 extends further upward than the upper open end of the sheath C2, the optical fiber core F2 is prevented from being sharply bent (or being subjected to a stress concentration) at the open of the sheath C2.

After passing downwardly through the cable retaining part P3, the optical fiber cable 21 passes through a cable engaging part Q3 at a point slightly short of the lower end of the upper link A1. The cable engaging part Q3 includes a sheath fixing part Q3-2 that fixedly secures the sheath C2 to the upper link A1. The cable engaging part Q3 is not provided with a part that retains the optical fiber core F2 either to the sheath C2 or to the upper link A1. Therefore the optical fiber core F2 can deflect or otherwise move within the sheath C2 at the cable engaging part Q3. After passing through the cable engaging part Q3, the optical fiber core F2 extends further along the upper link A1 to the lower end thereof.

After passing through the cable engaging part Q3, the optical fiber cable 21 extends to the elbow joint ER which in this case consists of a first coupling ER1, an intermediate link E having one end connected to the first coupling ER1 and a second coupling ER2 connected to the other end of the intermediate link E. The first coupling ER1 includes a pivot pipe 22 pivotally connecting the lower end of the upper link A1 with the upper end of the intermediate link E. The second coupling ER2 includes a pivot pipe 23 pivotally connecting the lower end of the intermediate link E with the upper end of the lower link A2. The rotational center line (extending along the Y-axis) of the first coupling ER1 is orthogonal to that (extending along the X-axis) of the second coupling ER2.

The optical fiber core F2 is centrally received in the sheath C2 in a substantially coaxial manner. As there is an annular space defined between the outer periphery of the optical fiber core F2 and the inner periphery of the sheath C2, the optical fiber core F2 may deflect or otherwise move within the sheath C2. Owing to the presence of the sheath C2, any side pressure that may be applied to the optical fiber cable 21 is prevented from being applied to the optical fiber core F2 so that any loss in the transmission property of the optical fiber cable 21 can be avoided. The sheath C2 receives only one optical fiber core F2 in the illustrated embodiment as shown in FIG. 4A, but two or more optical fiber cores F2-1 and F2-2 may be received in a single sheath C2 as shown in FIG. 4B.

The optical fiber cable 21 extending downward from the cable engaging part Q3 is bent leftward (positive direction along the Y-axis), and is passed through an inner bore 24 of the pivot pipe 22 at the first elbow coupling ER1. At the bend of the optical fiber cable 21, the sheath C2 and the optical fiber core F2 may be spaced from each other in a substantially coaxial manner but, more accurately, the optical fiber core F2 may have a substantially greater radius of curvature than the sheath C2 at the bend. Therefore, the bending stress that is applied to the optical fiber core F2 at the bend can be minimized. Also, the optical fiber cable 21 may be given with an adequate slack for the optical fiber cable 21 not to contact the open end of the pivot pipe 22. Even when the optical fiber cable 21 contacts the open end of the pivot pipe 22, only the sheath C2 comes into contact with the open end of the pivot pipe 22, and the optical fiber core F2 is prevented from contacting the sheath C2. For this reason also, the stress that may be applied to the optical fiber core F2 can be minimized.

The optical fiber cable 21 extends through the inner bore 24 of the pivot pipe 22, and the inner diameter of the inner bore 24 is significantly greater than the outer diameter of the optical fiber cable 21 so that the optical fiber cable 21 can freely deflect in any direction perpendicular to the Y-axis, and twist around the Y-axis without suffering from any undue stress.

The optical fiber core F2 is desired to be able to withstand bending stress that may be produced in operation. In particular, the radius of curvature that is tolerated for the optical fiber core F2 may be smaller than that for the sheath C2. Thereby, any damage to the optical fiber cable 21 can be easily detected from outside because as long as the sheath C2 is in good order, it can be surmised that the optical fiber core F2 is sound. If any damage in the sheath C2 is detected, it is then possible that the optical fiber core F2 may also be damaged.

After passing through the inner bore 24 of the pivot pipe 22, the optical fiber cable 21 is bent downward (negative direction along the Z-axis), and extends downward along the left side of the intermediate link E. The optical fiber cable 21 passes through a cable engaging part Q4 that includes a sheath fixing part Q4-2 for fixedly securing the sheath C2 of the optical fiber cable 21 to the intermediate link E. At the cable engaging part Q4, the optical fiber core F2 is not secured to the intermediate link E so as to be moveable in the sheath C2. In other words, the optical fiber core F2 is enabled to deflect and twist in the sheath C2 without touching the wall surface of the sheath C2 at the cable engaging part Q4.

The optical fiber cable 21 extends further downward from the cable engaging part Q4, and after being bent in the rearward and rightward direction, extends downward along the rear side of the intermediate link E. The optical fiber cable 21 is then passed through a cable engaging part Q5 which consists of a sheath fixing part Q5-2. The lower end of the intermediate link E is connected to the upper end of the lower link A2 via a pivot pipe 23 extending perpendicularly to the paper and coaxially defining an inner bore 25.

At the lower end of the intermediate link E, the optical fiber cable 21 is bent in a perpendicular direction (in the direction to come out of the paper), and is passed through the inner bore 25 of the pivot pipe 23. The optical fiber cable 21 is then bent again into a vertical direction to extend downward along the front side of the lower link A2. The optical fiber cable 21 then passes through a cable engaging part Q6 and a cable retaining part P4, in that order, before reaching the optical transceiver module AO2.

The cable engaging part Q6 includes a sheath fixing part Q6-2 that fixedly secures the sheath C2 to the lower link A2. The cable engaging part Q6 is not provided with a part that retains the optical fiber core F2 either to the sheath C2 or to the lower link A2. Therefore the optical fiber core F2 can deflect or otherwise move within the sheath C2 at the cable engaging part Q6. After passing through the cable engaging part Q6, the optical fiber core F2 extends further along the lower link A2.

At the cable retaining part P4, the sheath C2 is fixedly secured to the lower link A2 by a sheath fixing part P4-2, and the optical fiber core F2 is fixedly secured to the sheath C2 (and hence to the lower link A2 via the sheath fixing part P4-2) by a core fixing part P4-1.

The sheath C2 of the optical fiber cable 21 that has passed through the cable engaging part Q6 and the cable retaining part P4 terminates at a point intermediate between the cable retaining part P4 and the optical transceiver module AO2. In this part, the core fixing part P4-1 projects downward from the terminal end of the sheath C2 toward the optical transceiver module AO2, and the optical fiber core F2 extends centrally from the core fixing part P4-1 to be connected to an optical receiver AO2R of the optical transceiver module AO2.

Thus, in this embodiment, the lower link A2 can be pivotable with respect to the upper link A1 around the Y-axis and the X-axis while the optical fiber cable 21 extend between the upper link A1 and the lower link A2 without suffering from any undue stress.

Optionally, an additional cable engaging part or an auxiliary cable engaging part Q11 may be provided next to the cable engaging part Q3 or between the cable retaining part P3 and the cable engaging part Q3. Also, additional cable engaging parts or auxiliary cable engaging parts Q12 and Q13 may be provided next to the cable engaging parts Q4 and Q5, respectively, so that the optical fiber cable 21 may be properly guided along the left side and the back side of the intermediate link E in a favorable manner. Similarly as the auxiliary cable engaging part Q11, an additional auxiliary cable engaging part Q14 may be provided next to the cable engaging part Q6 or between the cable retaining part P4 and the cable engaging part Q6.

(Third Embodiment)

FIG. 6A shows a third embodiment of the present invention which includes a linear joint (telescopic joint) MR formed by a joint mechanism 301 by which an upper link M1 can linearly move relative to a lower link M2 extending coaxially with the upper link M1 along a common axial line.

The upper link M1 consists of a tubular member having an open lower end provided with a first flange M1-1 directed in a radially inward direction, and an optical transceiver module MO1 is fixedly attached to the inner wall surface of the upper link M1. An upper open end of the lower link M2 is fitted into the inner bore of the upper link M1 from the open lower end thereof so that the upper link M1 and the lower link M2 are slidably engaged with each other in a telescopic manner. An optical transceiver module MO2 is fixedly attached to the inner wall surface of the lower link M2.

The upper open end of the lower link M2 is provided with a second flange M2-1 directed in a radially outward direction so that the first flange M1-1 and the second flange M2-1 engage with each other when the upper link M1 and the lower link M2 are pulled apart in an axial direction as shown in FIG. 6A. The lower link M2 is additionally provided with a third flange M2-2 directed in a radially outward direction so that the lower link M2 can slide into the upper link M1 by a prescribed stroke which is determined by the axial distance between the second flange M2-1 and the third flange M2-2. In other words, the lower link M2 can slide into the upper link M1 until the first flange M1-1 abuts the third flange M2-2 as shown in FIG. 6B.

An optical fiber cable 31 is connected between the optical transceiver module MO1 of the upper link M1 and the optical transceiver module MO2 of the lower link M2 via the linear joint MR. The optical fiber cable 31 includes an optical fiber core F3 and a sheath C3 surrounding the optical fiber core F3 in a substantially coaxial manner. An end of the optical fiber core F3 is connected to an optical transmitter MO1T of the optical transceiver module MO1 for transmitting the optical signal from the optical transceiver module MO1. The optical fiber core F3 then extends downward, and is passed into the sheath C3 at a cable retaining part P5. At the cable retaining part P5, an end of the sheath C3 is fixedly attached to the upper link M1 via a sheath fixing part P5-2, and the optical fiber core F3 is fixedly attached to the sheath C3 via a core fixing part P5-1. The sheath C3 is firmly interposed between the core fixing part P5-1 and the sheath fixing part P5-2. Therefore, the optical fiber core F3 is fixedly attached to the upper link M1 via the core fixing part P5-1 and the sheath fixing part P5-2. Alternatively, the optical fiber core F3 may be fixedly attached to the upper link M1 solely via the core fixing part P5-1 by directly securing the core fixing part P5-1 to the upper link M1.

After passing downwardly through the cable retaining part P5, the optical fiber cable 31 passes through a cable engaging part Q7 at a point slightly short of the linear joint MR. The cable engaging part Q7 includes a sheath fixing part Q7-2 that fixedly secures the sheath C3 to the upper link M1. The cable engaging part Q7 is not provided with a part that retains the optical fiber core F3 either to the sheath C3 or to the upper link M1. Therefore the optical fiber core F3 can deflect or otherwise move within the sheath C3 at the cable engaging part Q7. After passing through the cable engaging part Q7, the optical fiber core F3 extends further along the upper link M1 to the lower end thereof.

The optical fiber cable 31 extends into the lower link M2 via the linear joint MR, and extends downward along the inner wall surface of the lower link M2. The optical fiber cable 31 then passes through a cable engaging part Q8 that includes a sheath fixing part Q8-2 for fixedly securing the sheath C3 of the optical fiber cable 31 to the lower link M2. At the cable engaging part Q8, the optical fiber core F3 is not secured to the lower link M2 so as to be moveable in the sheath C3. In other words, the optical fiber core F3 is enabled to deflect and twist in the sheath C3 without touching the wall surface of the sheath C3 at the cable engaging part Q8.

The optical fiber cable 31 extends further downward from the cable engaging part Q8, and passes through a cable retaining part P6 which is located between the cable engaging part Q8 and the optical transceiver module MO2. At the cable retaining part P6, the sheath C3 is fixedly secured to the lower link M2 by a sheath fixing part P6-2, and the optical fiber core F3 is fixedly secured to the sheath C3 (and hence to the lower link M2 via the sheath fixing part P6-2) by a core fixing part P6-1.

The sheath C3 of the optical fiber cable 31 that has passed through the cable engaging part Q8 and the cable retaining part P6 terminates at a point intermediate between the cable retaining part P6 and the optical transceiver module MO2. In this part, the core fixing part P6-1 projects downward from the terminal end of the sheath C3 toward the optical transceiver module MO2, and the optical fiber core F3 extends centrally from the core fixing part P6-1 to be connected to an optical receiver MO2R of the optical transceiver module MO2.

As shown in FIG. 6A, in the extended state of the linear joint MR, the optical fiber cable 31 extends substantially linearly along the inner wall surfaces of the upper link M1 and the lower link M2. As shown in FIG. 6B, in the retracted state of the linear joint MR, the optical fiber cable 31 is bent so that an intermediate part of the optical fiber cable 31 bows toward the opposite inner wall surfaces of the upper link M1 and the lower link M2. The linear stroke of the linear joint MR and the inner diameters of the upper link M1 and the lower link M2 are determined such that the optical fiber cable 31 is avoided from touching the inner wall surfaces of the upper link M1 and the lower link M2. Optionally, the optical fiber cable 31 may touch the inner wall surfaces of the upper link M1 and the lower link M2 without causing any undue stress in the optical fiber core F3.

In this embodiment also, owing to the presence of the annular gap defined between the optical fiber core F3 and the sheath C3, the maximum radius of curvature of the optical fiber core F3 of the optical fiber cable 31 is substantially greater than that of the sheath C3 when the upper link M1 and the lower link M2 are retracted toward each other, and the optical fiber cable 31 is bent as a result. Therefore, the optical fiber core F3 is favorably protected from being subjected to any undue stress.

(Fourth Embodiment)

Figure 7A:
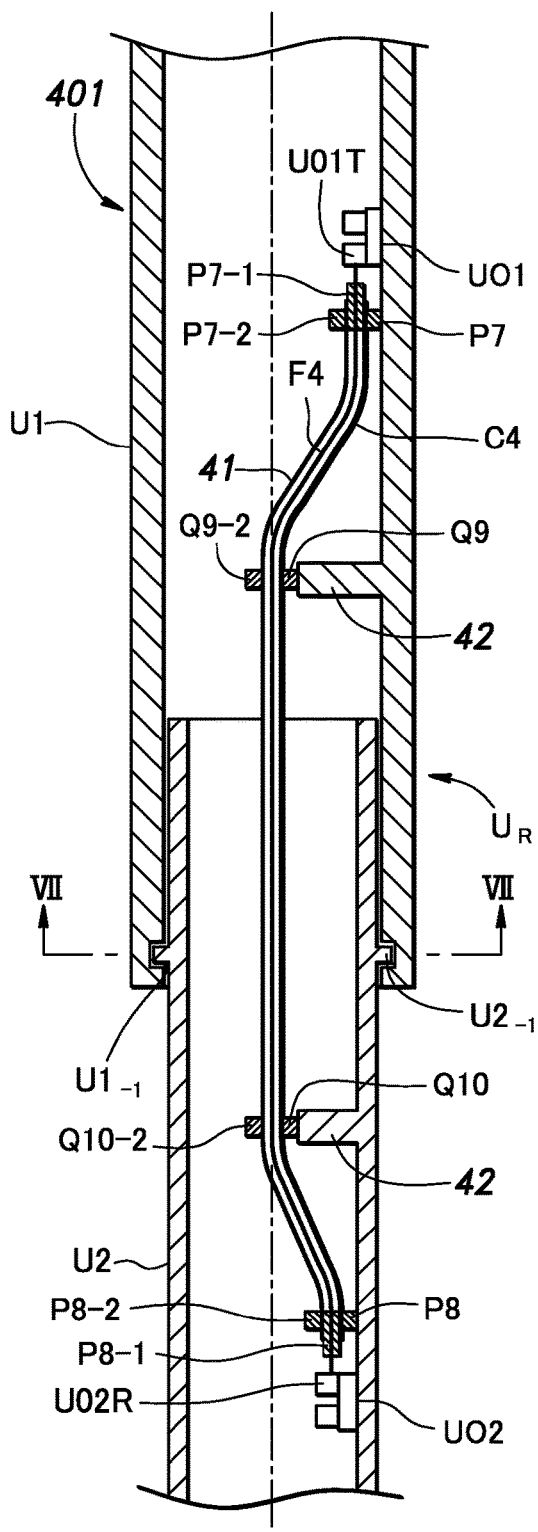
FIG. 7A is a sectional view of a twist joint mechanism including an optical fiber cable extending through the twist joint mechanism.
Figure 7B:
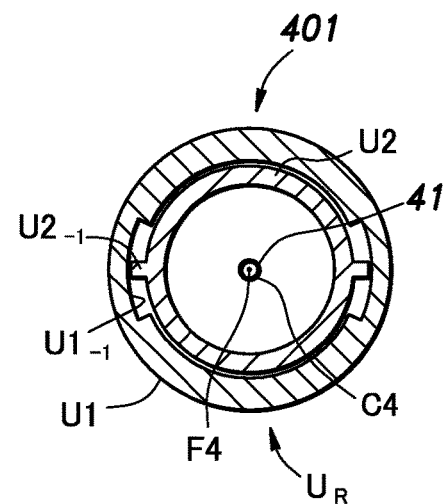
FIG. 7B is a sectional view taken along line VII-VII of FIG. 7A.

FIGS. 7A and 7B show a fourth embodiment of the present invention which includes a twist joint UR formed by a joint mechanism 401 by which an upper link U1 can twist (undergo a torsional movement) relative to a lower link U2 extending coaxially with the upper link U1 around a common axial line.

The upper link U1 consists of a tubular member having an open lower end, and the lower link U2 also consists of a tubular member having an open upper end snugly received in the open lower end of the upper link U1. The twist joint UR is formed by a pair of circumferential grooves U1-1 formed on the inner circumferential surface of the upper link U1, and a pair of projections U2-1 projecting radially outward from the outer circumferential surface of the lower link U2. The circumferential grooves U1-1 diametrically oppose each other and each extends over an angular range of about 45 degrees. The projections U2-1 project in diametrically opposing directions, and are received in the respective circumferential grooves U1-1.

An optical transceiver module UO1 is fixedly attached to the inner wall surface of the upper link U1, and another optical transceiver module UO2 is fixedly attached to the inner wall surface of the lower link U2. An optical fiber cable 41 extends from the optical transceiver module UO1 in the upper link U1 to the optical transceiver module UO2 in the lower link U2.

The optical fiber cable 41 includes an optical fiber core F4 and a sheath C4 surrounding the optical fiber core F4 in a substantially coaxial manner. An end of the optical fiber core F4 is connected to an optical transmitter UO1T of the optical transceiver module UO1 for transmitting the optical signal from the optical transceiver module UO1. The optical fiber core F4 then extends downward, and is passed into the sheath C4 at a cable retaining part P7. At the cable retaining part P7, an end of the sheath C4 is fixedly attached to the upper link U1 via a sheath fixing part P7-2, and the optical fiber core F4 is fixedly attached to the sheath C4 via a core fixing part P7-1. The sheath C4 is firmly interposed between the core fixing part P7-1 and the sheath fixing part P7-2. Therefore, the optical fiber core F4 is fixedly attached to the upper link U1 via the core fixing part P7-1 and the sheath fixing part P7-2. Alternatively, the optical fiber core F4 may be fixedly attached to the upper link U1 solely via the core fixing part P7-1 by directly securing the core fixing part P7-1 to the upper link U1.

After passing through the cable retaining part P7, the optical fiber cable 41 passes through a cable engaging part Q9 which is supported by a spacer 42 extending from the inner wall surface of the upper link U1 such that the optical fiber cable 41 is engaged by the cable engaging part Q9 at the center of the inner bore of the upper link U1. The cable engaging part Q9 includes a sheath fixing part Q9-2 that fixedly secures the sheath C4 to the upper link U1. The cable engaging part Q9 is not provided with a part that retains the optical fiber core F4 either to the sheath C4 or to the upper link U1. Therefore the optical fiber core F4 can deflect or otherwise move within the sheath C4 at the cable engaging part Q9. After passing through the cable engaging part Q9, the optical fiber core F4 extends further along the central axial line of the upper link U1 to the lower end thereof.

The optical fiber core F4 is centrally received in the sheath C4 in a substantially coaxial manner. As there is an annular space defined between the outer periphery of the optical fiber core F4 and the inner periphery of the sheath C4, the optical fiber core F4 may deflect or otherwise move within the sheath C4. Owing to the presence of the sheath C4, any side pressure that may be applied to the optical fiber cable 41 is prevented from being applied to the optical fiber core F4 so that any loss in the transmission property of the optical fiber cable 41 can be avoided. The sheath C4 receives only one optical fiber core F4 in the illustrated embodiment as shown in FIG. 4A, but two or more optical fiber cores F4-1 and F4-2 may be received in a single sheath C4 as shown in FIG. 4B.

The optical fiber cable 41 extends into the lower link U2 via the twist joint UR, and extends downward along the central axial line of the lower link U2. The optical fiber cable 41 then passes through a cable engaging part Q10 which is also supported by a spacer 42 extending radially inward from the inner circumferential surface of the lower link U2 such that the optical fiber cable 41 is engaged by the cable engaging part Q10 at the center of the inner bore of the lower link U2. The cable engaging part Q10 includes a sheath fixing part Q10-2 that fixedly secures the sheath C4 to the lower link U2. The cable engaging part Q10 is not provided with a part that retains the optical fiber core F4 either to the sheath C4 or to the upper link U1. Therefore the optical fiber core F4 can deflect or otherwise move within the sheath C4 at the cable engaging part Q10. After passing through the cable engaging part Q10, the optical fiber core F4 extends further along the inner wall of the lower link U2, and passes through a cable retaining part P8 which is located between the cable engaging part Q10 and the optical transceiver module UO2. At the cable retaining part P8, the sheath C4 is fixedly secured to the lower link U2 by a sheath fixing part P8-2, and the optical fiber core F4 is fixedly secured to the sheath C4 (and hence to the lower link U2 via the sheath fixing part P8-2) by a core fixing part P8-1.

The sheath C4 of the optical fiber cable 41 that has passed through the cable engaging part Q10 and the cable retaining part P8 terminates at a point intermediate between the cable retaining part P8 and the optical transceiver module UO2. In this part, the core fixing part P8-1 projects downward from the terminal end of the sheath C4 toward the optical transceiver module UO2, and the optical fiber core F4 extends centrally from the core fixing part P8-1 to be connected to an optical receiver UO2R of the optical transceiver module UO2.

In this embodiment also, owing to the presence of the annular gap defined between the optical fiber core F4 and the sheath C4, the maximum radius of curvature of the optical fiber core F4 of the optical fiber cable 41 is substantially greater than that of the sheath C4 when the upper link U1 and the lower link U2 are twisted relative to each other, and the optical fiber cable 41 is bent as a result. Therefore, the optical fiber core F4 is favorably protected from being subjected to any undue stress.

Although the present invention has been described in terms of preferred embodiments thereof, it is obvious to a person skilled in the art that various alterations and modifications are possible without departing from the scope of the present invention.

The invention claimed is:

1. An articulate joint mechanism including a first link, a second link, a coupling mechanically connecting the first link with the second link in a mutually moveable manner at least with one degree of freedom, and an optical fiber cable extending from the first link to the second link via the coupling, the optical fiber cable including a fiber cable core and a sheath surrounding the fiber cable core, the mechanism comprising:
- a first cable retaining part provided in a part of the first link and including a sheath fixing part fixedly securing the sheath to the first link and a core fixing part fixedly securing the fiber cable core to the first link via the sheath and the sheath fixing part; and
- a first cable engaging part provided in a part of the first link located between the first cable retaining part and the coupling and including a sheath fixing part fixedly securing the sheath to the first link while allowing the optical fiber core to deflect freely.

2. The articulate joint mechanism according to claim 1, further comprising:
- a second cable retaining part provided in a part of the second link and including a sheath fixing part fixedly securing the sheath to the second link and a core fixing part fixedly securing the fiber cable core to the second link; and
- a second cable engaging part provided in a part of the second link located between the second cable retaining part and the coupling and including a sheath fixing part fixedly securing the sheath to the second link while allowing the optical fiber core to deflect freely.

3. The articulate joint mechanism according to claim 1, wherein the first link and the second link are mechanically connected to each other via a first coupling, an intermediate link and a second coupling which are connected in series in that order, each coupling connecting the associated links in a mutually moveable manner with at least one degree of freedom, and the intermediate link is provided with a pair of intermediate cable engaging parts positioned in an axially spaced apart relationship and each including a sheath fixing part fixedly securing the sheath to the intermediate link while allowing the optical fiber core to deflect freely.

4. The articulate joint mechanism according to claim 1, wherein the first link further comprises an auxiliary cable engaging part provided between the first cable retaining part and the first cable engaging part and including a sheath fixing part fixedly securing the sheath to the first link while allowing the optical fiber core to deflect freely.

5. The articulate joint mechanism according to claim 2, wherein the first link further comprises a first auxiliary cable engaging part provided between the first cable retaining part and the first cable engaging part and including a sheath fixing part fixedly securing the sheath to the first link while allowing the optical fiber core to deflect freely, and
the second link further comprises a second auxiliary cable engaging part provided between the second cable retaining part and the second cable engaging part and including a sheath fixing part fixedly securing the sheath to the second link while allowing the optical fiber core to deflect freely.

6. The articulate joint mechanism according to claim 1, wherein the coupling comprises a pivot coupling.

7. The articulate joint mechanism according to claim 6, wherein the pivot coupling includes a pivot pipe pivotally connecting opposing ends of the first link and the second link, and the optical fiber cable is passed through an inner bore of the pivot pipe.

8. The articulate joint mechanism according to claim 3, wherein the first coupling and the second coupling comprise pivot couplings, respectively, having mutually orthogonal rotational center lines.

9. The articulate joint mechanism according to claim 1, wherein the coupling comprises a linear coupling configured to allow the first link and the second link to move axially relative to each other.

10. The articulate joint mechanism according to claim 9, wherein the first link and the second link comprise tubular members that are telescopically combined with each other, and the first cable retaining part and the first cable engaging part are provided on an inner wall surface of the first link.

11. The articulate joint mechanism according to claim 1, wherein the coupling comprises a twist coupling configured to allow the first link and the second link to turn around an axial line relative to each other.

12. The articulate joint mechanism according to claim 11, wherein the first link and the second link comprise tubular members that are coaxially combined with each other, and the first cable engaging part is positioned on an axial center line of the two links.

13. The articulate joint mechanism according to claim 1, wherein the optical fiber cable includes two or more optical fiber cores received in the sheath.

14. The articulate joint mechanism according to claim 1, wherein a tolerable minimum radius of curvature of the fiber cable core is smaller than that of the sheath.

15. The articulate joint mechanism according to claim 1, wherein the core fixing part includes an annular member having the fiber cable core passed therethrough and coaxially disposed in the sheath.

16. The articulate joint mechanism according to claim 15, wherein the sheath has a terminal end at a part displaced from the cable retaining part away from the cable engaging part, and the core fixing part extends further away from the first cable engaging part than the terminal end of the sheath.

* * * * *